Sept. 24, 1935.  W. E. ROONEY  2,015,089
FISH CANNING MACHINE
Filed April 16, 1932  4 Sheets-Sheet 1

INVENTOR
Walter E. Rooney
BY
John C. Carpenter
ATTORNEY

Sept. 24, 1935.    W. E. ROONEY    2,015,089
FISH CANNING MACHINE
Filed April 16, 1932    4 Sheets-Sheet 3

INVENTOR
Walter E. Rooney.
BY
John C. Carpenter
ATTORNEY

Sept. 24, 1935.                    W. E. ROONEY                    2,015,089
                                FISH CANNING MACHINE
                        Filed April 16, 1932          4 Sheets-Sheet 4

Patented Sept. 24, 1935

2,015,089

UNITED STATES PATENT OFFICE 2,015,089

FISH CANNING MACHINE

Walter E. Rooney, Bellingham, Wash., assignor to American Can Company, New York, N. Y., a corporation of New Jersey Application April 16, 1932, Serial No. 605,716

17 Claims. (Cl. 226—101)

The present invention relates to a fish canning machine and has particular reference to an automatic machine wherein cut fish are received and handled in an unbroken mass from which a charge of fish of predetermined quantity is first segregated, then brought into cylindrical form and filled into a can.

The principal object of the invention is the provision of an apparatus for filling predetermined amounts of fish into cans by conveying the fish mass through a swinging tunnel and out through a discharge opening in segregated quantities which are brought into cylindrical can form prior to introduction into the can all of the operations being performed in an automatic and rapid manner.

An important object of the invention is the provision of an oscillating tunnel for an apparatus of the character described which has a discharge opening brought into and moved in registration with successive measuring chambers carried on a rotating turret so that given charges of fish are segregated from the fish in the tunnel as a charge is positioned into each measuring chamber.

A further important object of the invention is the provision of improved devices for moving an oscillating fish feeding tunnel so as to register with an open measuring chamber carried in a rotary path of travel and for controlling the position, shape and size of the discharge opening of the tunnel to insure proper registration with the chamber.

An important object of the invention is the provision of an improved oscillating feeding tunnel for cut fish wherein the mass of fish after moving through the tunnel is discharged out through a controlled discharge opening in predetermined amounts which are cut off and separated from the fish mass when filled into moving measuring chambers.

Numerous other objects of the invention will be apparent as it is better understood from the following description, which, taken in connection with the accompanying drawings, discloses a preferred embodiment thereof.

Referring to the drawings.

The apparatus used to exemplify the present invention discloses only sufficient parts of the principal working elements of a machine to illustrate the steps in the operation of receiving cut fish and placing a formed charge of predetermined quantity into a can. This machine is similar in some respects to the apparatus of my joint invention with Samuel S. Jacobs, as disclosed in our pending application, filed in the United States Patent Office May 31, 1930, as Serial No. 458,804.

The present invention is particularly directed to the simplification of steps in the filling operation by which cut fish is first passed through a transfer tunnel or tunnel section and thence into an oscillating feeding tunnel or tunnel section of practically the same cross-sectional dimensions. The fish mass is moved through the feeding tunnel by fork instrumentalities which enter from one side of the tunnel and urge the fish forward and out through a discharge opening which is controlled in shape and size by a sliding section of the tunnel wall.

The tunnel discharge opening is adapted to register throughout a short period of movement with each of a plurality of measuring chambers carried on a rotating turret. Each measuring chamber is of variable capacity being at maximum capacity when fully open and at minimum capacity when closed. The opening and closing of each chamber is brought about by the sliding of one of the end walls of the chamber as it is conveyed around its circular path of travel by the rotating turret.

The chamber is at its maximum capacity when it passes the discharge opening of the oscillating feeding tunnel and at such passage the mouth of the tunnel moves in register with the open chamber while the fish mass is crowded toward the chamber. As the chamber becomes filled, the mass of fish extending into the measuring chamber is caused to move against an oscillating knife which severs the charge filling the chamber from the fish mass. The return oscillation of the tunnel moves it back into position for registration with the next or adjacent chamber.

The isolated charge in the chamber is fully compressed into can filling shape as the chamber closes and this compressed charge is then moved by a plunger into a positioned can carried by the turret. The can filled with fish is then discharged from the apparatus. The rotation of the turret with its measuring chambers is continuous and each chamber is automatically filled with fish as it moves along with the discharge opening of the oscillating feeding tunnel.

Figures 1, 2:
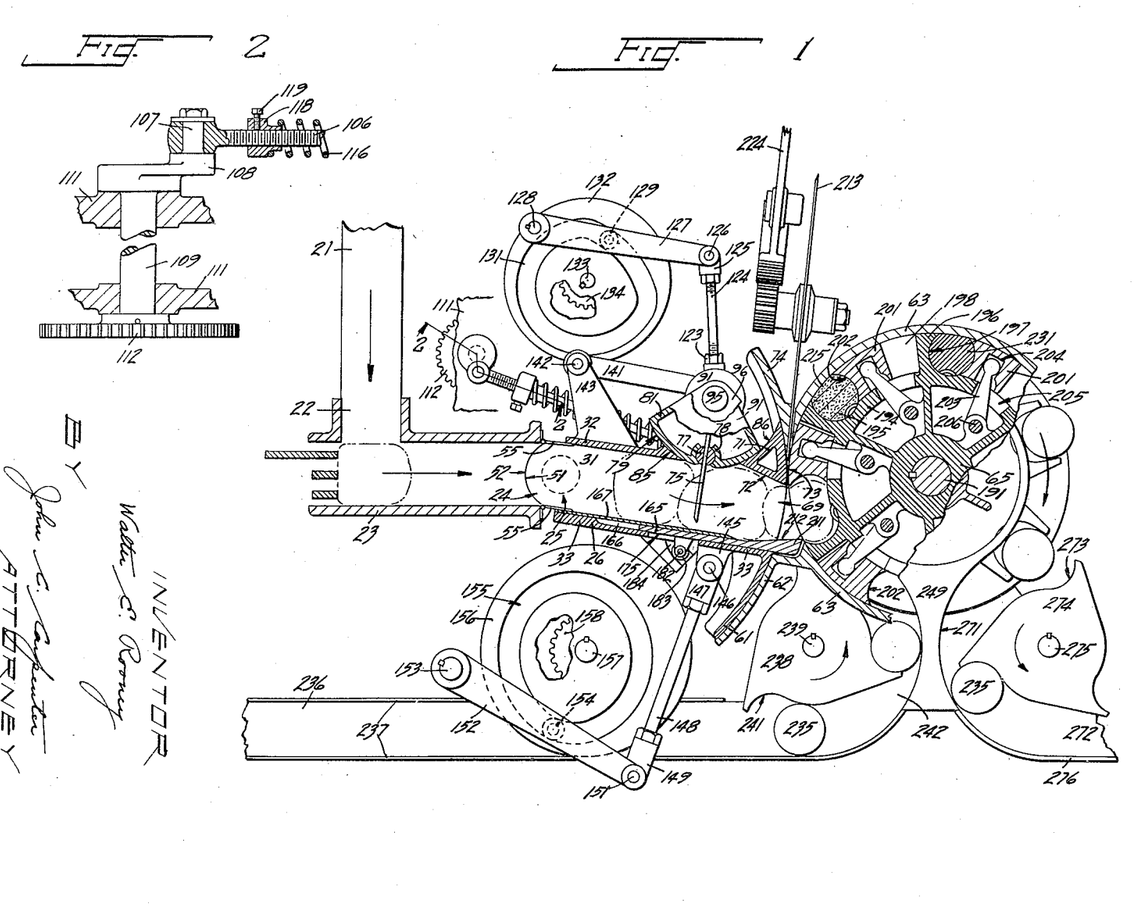
Figure 1 is a schematic plan sectional view of an apparatus embodying the present invention being taken substantially along the line 1—1 in Fig. 6, parts being broken away.
Fig. 2 is a fragmentary sectional detail taken substantially along the broken line 2—2 in Fig. 1.

The fish is preferably received in cut form being the proper height for filling into the can and these cut pieces may be brought into the apparatus on any suitable conveyor 21 (Fig. 1). This conveyor introduces the cut fish in standing vertical position through an opening 22 formed in the side wall of a tunnel having transfer tunnel section 23. One end of the tunnel may be closed by a lattice through which suitable feeding devices may operate for advancing the fish through this end of the tunnel. At the opposite end of the tunnel section, the fish pass through an unrestricted opening or mouth 24 which communicates with an inlet or receiving end 25 of an oscillating section or tunnel 26.

Figure 6:
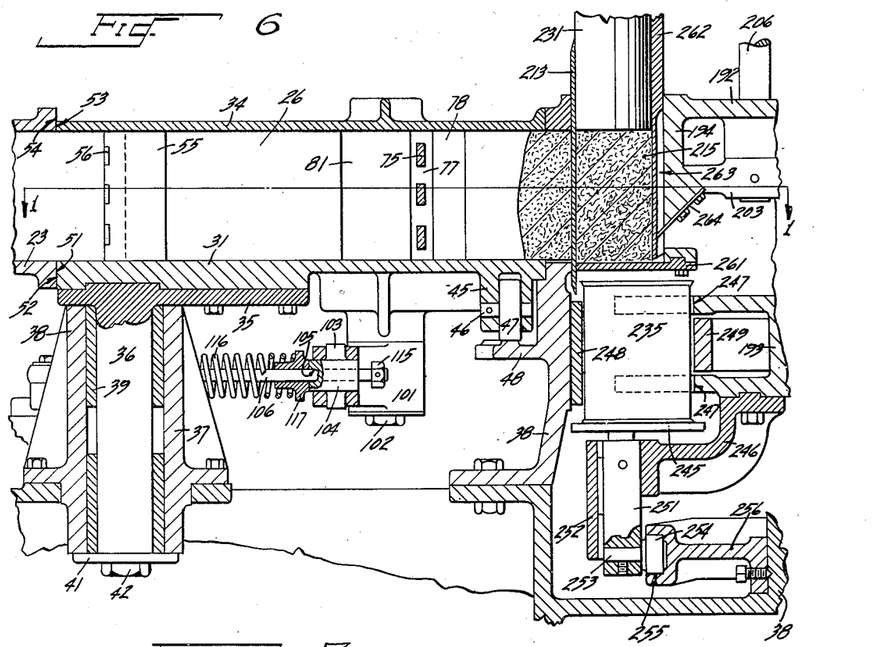
Fig. 6 is an enlarged longitudinal sectional detail through the oscillating tunnel, being taken substantially along the broken line 6—6 in Fig. 4.
Figures 10, 11:
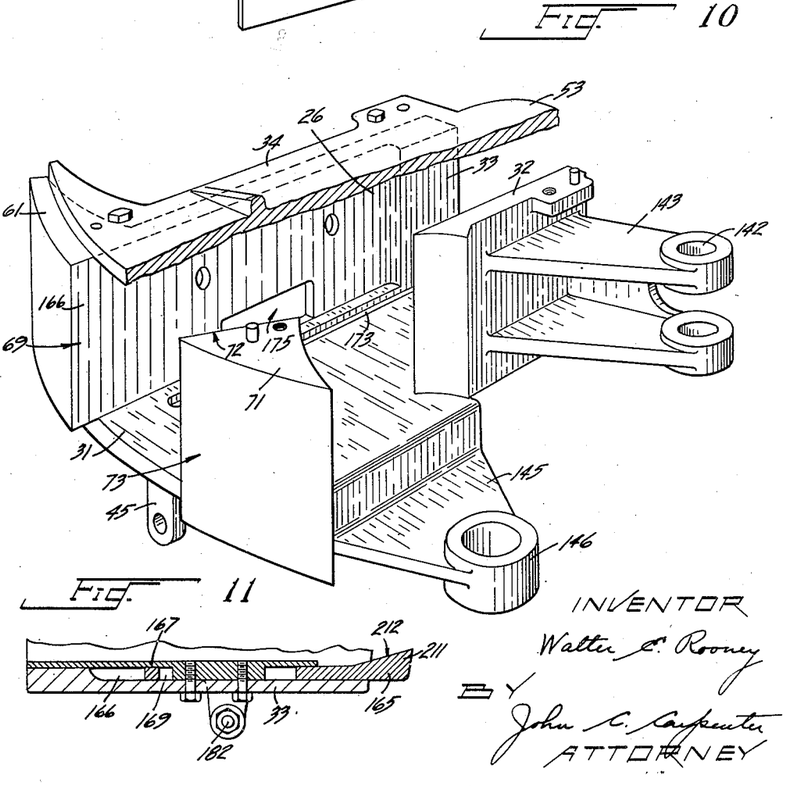
Fig. 10 is an enlarged fragmentary perspective view of the discharge end of the oscillating tunnel, such as would appear if viewed from a position indicated by the arrow marked by the numeral 10 in Fig. 3.
Fig. 11 is a sectional detail taken substantially along the line 11—11 in Fig. 7.

The oscillating tunnel section comprises a horizontal floor 31 (Figs. 1, 6 and 10) and the upper surface of this movable floor is in the same plane as the stationary floor of the transfer tunnel 23 and fish pass freely from the tunnel 23 into the tunnel 26. The feeding tunnel 26 is also formed with vertical side walls 32, 33 and a plate 34 bolted to the side walls provides a roof for the tunnel.

The floor 31 is mounted upon a head 35 of a vertical pivot post 36 which is mounted for oscillation within a bearing 37 formed in a frame 38 of the machine. Bushings 39 are preferably interposed between the post and its bearing and a collar 41 is held on the lower end of the shaft by a bolt 42. The tunnel 26 oscillates on the vertical center of the post 36 as an axis, this producing a hinging movement between the tunnel sections.

Lugs 45 project downwardly from the floor 31 of the tunnel and carry a pin 46 on which is rotatably mounted a support roller 47. This roller provides an anti-frictional support for the movable end of the tunnel and rides upon a shelf 48 formed in the frame 38. The floor 31 is rounded at 51 in a curve which has the vertical center of the post 36 as a center and this rounded end moves within a concave pocket 52 formed in the floor of the tunnel 23.

In a similar manner the roof plate 34 is formed with a rounded end 53 which movably fits within a pocket 54 formed in the tunnel 23. These socket joints permit oscillation of the feeding tunnel 26 while maintaining the continuity of surface of the floor and ceiling walls of the two tunnels. Plates 55 hinged at 56 to the inside walls of the discharge end of the transfer tunnel 23 extend inside of the side walls 32, 33 of the tunnel 26 and prevent side openings between the tunnel sections during the oscillating movement.

The wall 33 of the tunnel 26 is extended laterally as at 61 (Figs. 1 and 10) to provide a cylindrical front wall section for the tunnel, the curvature of this wall having the axis of the post 36 as a center. The wall 61 slidably fits within a concave cylindrical wall 62 formed as an extension to a turret casing 63 which partially surrounds the measuring chambers as will be hereinafter fully described. During the oscillation of the feeding tunnel 26, the wall 61 moves freely and maintains a close fit within the wall 62.

The free or open end of the tunnel 26 adjacent the extension 61 provides a discharge opening 69 through which the mass of fish moves from the oscillating tunnel at periodic intervals for the filling operation. A triangular member 71 is carried by the tunnel section 26 and stands vertically at one side of the discharge opening, being secured top and bottom to the parts 34, 31. The position of this triangular member at the mouth of the tunnel assists in restricting the discharge opening so that the fish at no time have any tendency of falling out through the discharge opening, an inner face 72 of the member 71 being disposed at a slight angle to the tunnel side walls 32, 33 for this purpose.

An outer face 73 of the member 71 is in circular alignment with, or in other words has the same circular configuration as, the outer surface of the extension 61. During oscillation of the tunnel section this face slides along a curved extension 74 projecting from the opposite side of the tunnel mouth in the same manner as the extension 62, being also formed as an integral part of the casing 63. The member 71 during the tunnel oscillation moves freely and maintains a close fit within the wall 74.

Figure 7:
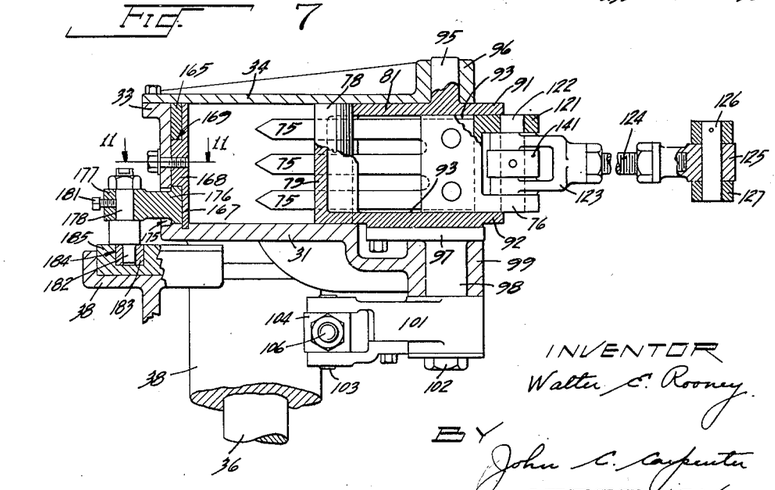
Fig. 7 is an enlarged composite sectional detail taken substantially along the broken line 7—7 in Fig. 4.
Figures 8, 9:
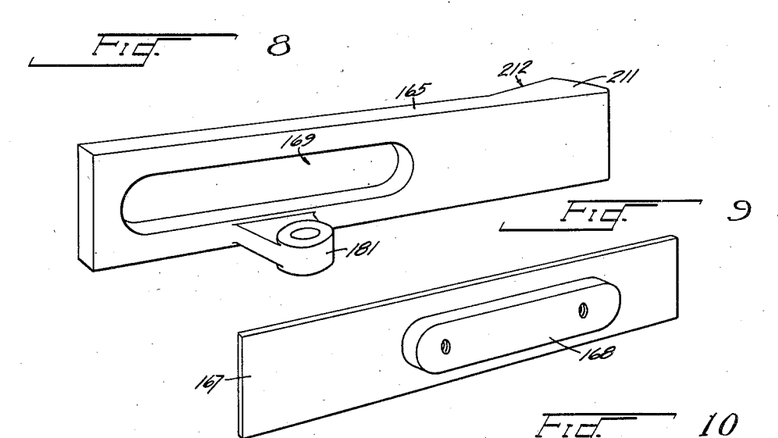
Figs. 8 and 9 are perspective views of parts of certain devices which are located in the tunnel and which control the position, shape and size of the tunnel's discharge opening.

The fish mass is fed through the oscillating tunnel 26 by advancing fork instrumentalities which operate through one side of the tunnel being located between the wall 32 and the triangular member 71. These instrumentalities comprise a fork member 75 (Figs. 1, 6 and 7) bolted to a slide block 76. The prongs of the fork slide within slots cut through a vertical shaft 77 (Fig. 6) carried in a sleeve 78 formed as a part of a wall 79 of an oscillating cylindrical segment 81.

The wall 79 provides the cylindrical surface for this segment and closely fits and slides back and forth in concave wall pockets 85, 86 during oscillation of the segment. These pockets 85, 86 are formed respectively in the wall 32 and in the member 71. This segment face 79, in the gap between the ends of the parts 32, 71, forms a part of the side of the tunnel and directly contacts the fish mass.

The oscillating member 81 has upper and lower horizontal walls 91, 92 (Fig. 7) between which the block 76 has sliding movement within radial slots 93. The wall 91 is projected upwardly in a stud 95 which pivotally moves in a bearing 96 formed in the plate 34 of the tunnel 26. The wall 92 is bolted to a disc 97 which projects downwardly in a stud 98 which has oscillating movement within a bearing 99 formed in the floor 31 of the tunnel. The studs 95, 98 are in vertical alignment and the member 81 oscillates on this vertical axis to feed the fish through the tunnel section.

The member 81 is oscillated by crank connection with the stud 98 as best illustrated in Figs. 3, 4, 6 and 7. For this purpose the stud 98 carries an arm 101 which is secured by a bolt 102 threadedly engaging the end of the stud. The arm 101 is pivoted at 103 to a block 104 which is apertured at 105 for the reception of one end of a connecting rod 106 (see also Fig. 2) pivoted at 107 to a crank 108 carried by a shaft 109. This shaft is rotated in bearings 111 formed in the frame of the machine in any suitable manner as by connection with a gear 112 secured to the shaft.

Normally the connecting rod 106 provides a fixed connection between the crank 108 and the arm 101 but in the event of a jamming or improper feeding of fish, provision is made for allowing the full movement of the rod with the crank without moving the arm. At such abnormal time the rod 106 slides within the aperture 105 in the block 104, the results of such movement being illustrated in Fig. 6. A nut 115 is mounted on and pinned to the end of the rod 106 outside of the block 104 and when the rod slides this nut leaves the block as shown. A spring 116 is mounted on the rod to provide a yielding connection between the parts, one end of the spring engaging a collar 117 slideably mounted upon the rod and which under the action of the spring rests against the block 104. The opposite end of the spring 116 engages a collar 118 which is threadedly secured to the rod 106.

The position of this collar 118 on the rod controls the yielding force of the spring and a set-screw 119 is used to lock the collar in adjusted position. In the event that the arm 101 is prevented from moving, which might occur if too great a mass of fish were fed, the crank 108 would continue its movement and the rod 106 sliding through the block 104 would only compress the spring without damage to the machine. By means of the connection just described, the member 81 is caused to oscillate back and forth and this is done while it maintains a close fit within the tunnel walls.

Oscillation of the member 81 on its backward stroke carries the shaft 77 toward the entrance end of the tunnel 26. The forks 75 at such time are back and out of the tunnel, their in and out movement being cam controlled. Block 76 is provided with a pair of spaced lugs 121 (Fig. 7) which hold a pivot pin 122 on which is mounted the bifurcated end of a shackle 123 threadedly secured to a connecting rod 124.

The opposite end of the connecting rod is secured within a block 125 (see also Figs. 1 and 3) which is pivoted at 126 to one end of an arm 127 keyed to a rock shaft 128 mounted in any suitable manner. The arm 127 carries a cam roller 129 which operates within a groove 131 formed in a face cam 132. The cam 132 is mounted upon a shaft 133 which may be continually rotated in any suitable manner as by connection with a gear 134 secured to the shaft.

Figure 3:
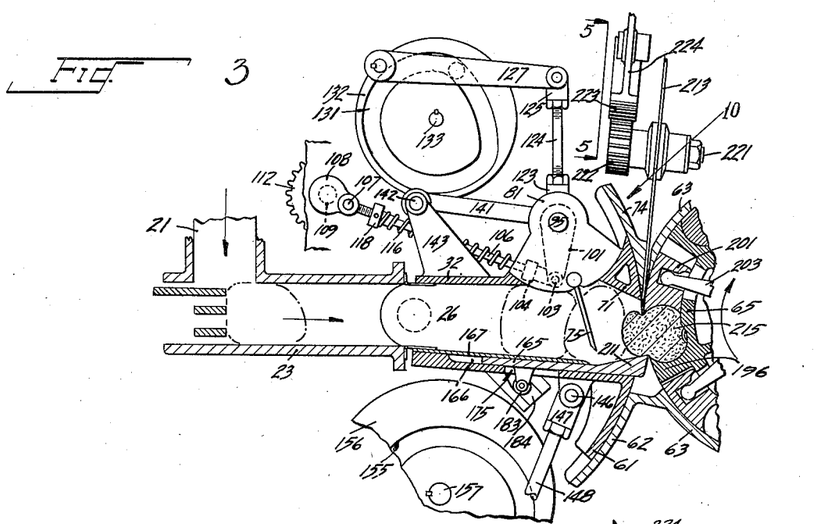
Figs. 3 and 4 are fragmentary views of substantially what is shown in Fig. 1, these views illustrating different feeding positions.

Just before movement of the oscillating member 81 on its forward stroke (counterclockwise Fig. 1) the ends of the forks 75 are pushed out through the slots in the shaft, into the tunnel and through the mass of fish. The forks then remain in extended fish engaging position during the oscillation of the member 81, the forks being bodily moved toward the discharge opening of the tunnel. Fig. 1 illustrates the position of these parts just after the forward oscillating stroke has begun and Fig. 3 shows the parts at the end of the stroke. This combined movement of the forks and oscillating member crowds the fish along the tunnel and moves a part of it out through the discharge opening at each operating cycle.

Figures 4, 5:
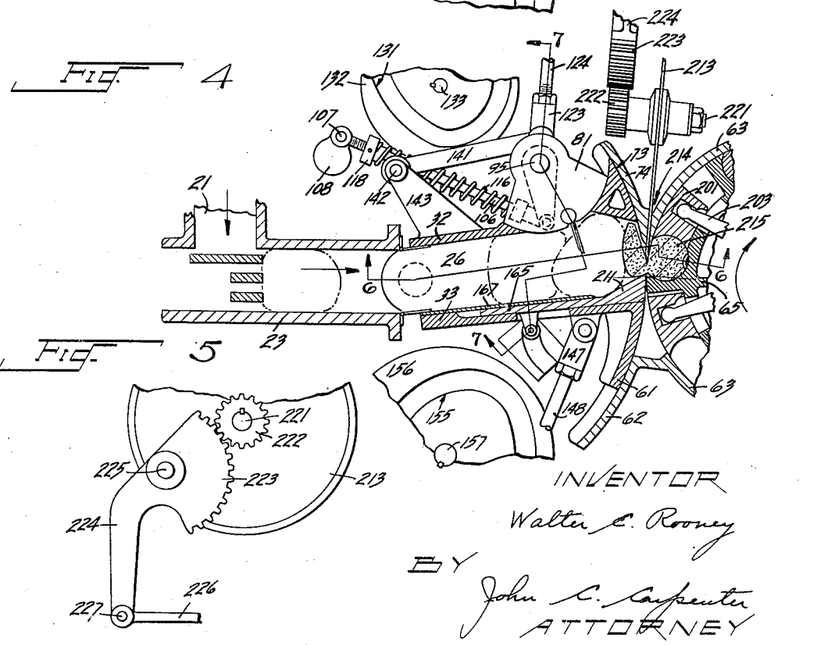
Fig. 5 is a fragmentary detail of a part of the fish cutting or segregating devices, substantially as would appear if viewed from a position indicated by the line 5—5 in Fig. 3.

While this movement of the fish takes place through the tunnel, the latter is oscillated on its pivotal post 36 from the position illustrated in Fig. 1 into the position of Fig. 4. Owing to this combination movement of the fork block 76, i. e. laterally and also back and forth, it is necessary to support the pivot 122 of the fork block so that it moves independently of the tunnel walls. For this purpose a link 141 (Figs. 1 and 7) is connected to the pin 122 inside the shackle 123 and the opposite end of the link is pivotally connected at 142 to support arms 143 projected outwardly from the tunnel wall 32 (see also Fig. 10).

Oscillation of the tunnel 26 is effected by a cam control best illustrated in Fig. 1. For this purpose the floor 31 of the tunnel 26 is projected laterally in a lug 145 which carries a boss 146 providing pivotal connection for a shackle 147 connected to one end of a connecting rod 148. The other end of the rod threadedly engages a block 149 pivoted at 151 to the end of a lever 152 secured to a rockshaft 153. The lever 152 carries a cam roller 154 which operates in a cam groove 155 formed in a face cam 156 secured to a shaft 157. This shaft 157 and cam 156 may be rotated in any suitable manner as by application of power to a gear 158 secured to the shaft. Both of the shafts 153, 157 may be suitably mounted in the frame of the apparatus.

The shape and position of the discharge opening 69 of the tunnel 26 varies as the tunnel oscillates and results from the change of position of a sliding plate 165 (Figs. 1, 3, 4, 8, 10 and 11). This plate slides alongside of the wall 33, which is recessed at 166 to accommodate it. A retaining plate 167 (see also Fig. 9) is bolted to the inner face of the wall 33 and is inside of the plate 165 which slideably engages it. The plate 167 forms the inner or fish contacting side wall for the tunnel throughout substantially its length.

This plate 167 is also formed with an elongated boss section 168 where it connects with the wall 33. The sliding plate 165 is formed with an elongated slot 169 (Figs. 7, 8 and 11), the walls of which enclose the boss 168, the slot being only slightly wider than the boss but considerably longer so as to maintain correct alignment of the plate 165 during its longitudinal movement at the same time preventing excessive movement or displacement.

The plate 165 is moved by connection from the outside of the tunnel. For this purpose the tunnel wall 33 is slotted at 175 and operating in this slot is a lug 176 (Figs. 1, 3, 7 and 8) projecting outwardly from the rear of the plate and the end of the lug terminates in a boss 177 which provides support for a pin 178 held in adjusted position within the boss by a setscrew 181. This pin is formed with an eccentric shank 182 on which a cam roller 183 is rotatably mounted. Oscillation of the tunnel carries this cam roller back and forth within a cam groove 184 formed in the upper face of a cam block 185 held in stationary position within the frame 38. This action effects a sliding movement of the plate 165 and projects and retracts its forward end for a purpose hereinafter described. The plate 165 may be accurately positioned relative to the tunnel wall by shifting of the pin 178 on its own axis within the boss 177 and after such adjustment the sliding movements of the plate automatically follows under the control of the cam.

The turret 65 (Fig. 1) is mounted upon a vertical shaft 191 and is formed with an upper frame 192 (see also Fig. 6) and a lower frame 193. The shaft 191 is suitably mounted for rotation within the frame 38 of the machine and is continually revolved with its turret members 192, 193. The turret section 192 is formed with a cylindrical wall 194 which is spaced inwardly from the casing wall 63 and located within this space are the measuring chambers for receiving the predetermined charges of fish.

These measuring chambers are designated by the numeral 195 and each chamber has a stationary section 196 which has its inner face shaped to provide a cylindrical wall 197 which opens out toward a chamber 198 formed between the walls 63, 194.

A sliding block 201 is located in each of these chambers 198 and provides a movable part for the measuring chamber 195. The inner face of each block 201 is shaped as a cylindrical wall 202 which corresponds in its size and contour to the wall 197 of the stationary member 196.

When in closed position these walls 197, 202 cooperate to form a substantially cylindrical pocket as the measuring chamber. Fish passes from the tunnel 26 as it is fed through the discharge opening 69 and into these measuring chambers and the cylindrical walls 197, 202 act as molds to compress and shape a segregated charge into proper form for introduction into a can as will now be explained.

Each sliding block 201 is moved away from and toward its companion fixed wall 196 by an arm 203 engaging within a slot 204 formed in the block 201, each arm moving within a slot 205 cut through the cylindrical wall 193. The arm 203 is mounted on an oscillating shaft 206 which is moved back and forth to effect the proper opening and closing of the measuring chamber. The arms 203 are or may be operated as disclosed in the above mentioned application 458,804, the means for such purpose not being claimed herein.

Such movement of the block 201 is automatically made during the continuous rotation of the turret 65. As a measuring chamber 195 approaches the discharge end of the tunnel 26, its block 201 moves away from the fixed wall 196. As the measuring chamber is presented to the discharge opening it is open and at its greatest capacity. It is then that the tunnel 26 is at one end of its oscillating stroke and the plate 165 is in its extended position as illustrated in Fig. 1.

The plate 165 is provided with an enlarged head 211, an inner wall 212 cooperating with the wall 72 of the member 71 and forming a restricted opening for the discharge end of the tunnel which is equal to the opening in the aligned measuring chamber when the parts are in the position shown in Fig. 1. In this extended position of the plate 165, its head 211 is adjacent the outer edge of the advancing wall 196 of the measuring chamber and fish passing over the surface 211 is guided into the open measuring chamber.

It is the forks 75 which are moving the mass of fish forward and out through the discharge opening and into the open measuring chamber as the latter moves on its circular path of travel with the revolving turret. It will be understood that the plate 165 under its controlled sliding movement bridges the space between the end of the tunnel 26 and the turret 65 irrespective of the relative positions of tunnel and turret.

During this combined rotative movement of the measuring chamber and the oscillating movement of the tunnel, the parts shift from the position illustrated in Fig. 1 to a position illustrated in Fig. 3. When the latter position is reached the block 201 begins to approach the opposite chamber wall 197 and the capacity of the chamber begins to diminish as the fish mass is brought against a cutter.

Such a cutter is preferably formed as a beveled disc 213 which oscillates in a slot 214 extending vertically between the casing walls 63, 74. The operation of this cutter will be best understood by comparing Fig. 3 with Fig. 4, the latter illustrating the segregating of a fish charge 215, which fills the chamber, from the remaining mass of fish in the forward end of the tunnel. As the tunnel 26 reaches the end of its forward oscillation this segregation of the charge 215 is complete and immediately following the compression of the charge is also completed.

The wall 63 retains the charge of fish in the measuring chamber during its further movement from the cutting position. It will be observed that the measuring chamber when closed is not a complete cylinder, its outer wall being shortened along the curve of the wall 63. This flat side assists in positioning the fish charge into the can by allowing the air to escape as the charge is inserted. This feature will be more fully considered in connection with the description of filling which is to follow.

The cutter 213 may be mounted upon an oscillating shaft 221 (Figs. 4 and 5) which carries a pinion 222 meshing with a segmental rack 223 formed on a lever 224 mounted for oscillation on a shaft 225. The lever 224 is rocked back and forth in any suitable manner, as by connection with a rod 226 pivoted at 227 to the lever. The cutter shaft 221 may be suitably journaled in the frame of the machine.

The fully formed fish charge 215 within the closed measuring chamber 195 is directly beneath a vertically movable plunger 231 (Figs. 1 and 6) which has sliding movement within the turret wall 194. This plunger is used in the filling operation to discharge the fish charge 215 from its chamber while it is being carried around with the turret, said plunger being operated by means shown in my said co-pending application and not claimed herein.

Open top cans 235 (Fig. 1) are introduced into filling position within the turret by a conveyor 236 operating between spaced guide rails 237 which guide the cans into a starwheel 238. This starwheel may be mounted for continual rotation with a vertically disposed shaft 239 driven in any suitable manner. The starwheel is provided with a series of spaced can pockets 241 and each can as it is brought into the machine passes into one of these pockets.

The rotating starwheel carries each engaged can 235 around a circular path of travel, sliding it over a table 242 and depositing it upon a plunger 245 (Fig. 6) carried within a bracket 246 bolted to the turret frame 193. Each plunger 245 is in axial alignment and located beneath a can receiving pocket formed in the turret frame by semicircular recesses 247, (see also Fig. 1). The can, while in this turret pocket, is held against outward displacement by an outer guide rail 248 secured to the frame 38. A stationary circular plate 249 is also disposed centrally of the turret shaft 191 and this also assists in the guiding of the can.

Each plunger 245 (Fig. 6) is mounted upon the upper end of a vertically movable shaft 251 which extends through a bearing 252 formed in the bracket 246. The lower end of the shaft carries a pin 253 on which a cam roller 254 is rotatably mounted. As the plungers 245 are carried around with the revolving turret, each plunger roller 254 traverses a cam groove 255 formed in the periphery of a disc cam 256 mounted upon and secured to the stationary frame 38. This cam track 255 causes the roller to move up and down and this action carries the plunger with the can into a position in proper time to receive a charge of fish from the measuring chamber above.

A stationary plate 261 (Fig. 6) secured to the stationary frame 38 provides a bottom or floor for each measuring chamber during filling and the fish in the chamber is slid over this plate. After the chamber has been brought into its closed position and the charge of fish has been fully formed the chamber moves to a position beyond the end of the plate 261 and then the fish charge is unsupported from the bottom. At this time a can 235 is being raised until its open end is brought substantially against the frame of the measuring chamber. At the same time the guide member 249 is forcing the can outwardly (from the position shown in Fig. 6) while still within the pocket members 247 and sliding it over the upper surface of the plunger 245 until its center is brought into axial alignment with the center of the fish charge in the measuring chamber. The can and fish are then in position for the filling operation.

In filling the plunger 231 (Figs. 1 and 6) descends pushing the fish charge 215 downwardly from the measuring chamber into the positioned can. A curved vent knife 262 is preferably associated with each plunger and is moved downwardly ahead of it. The vent knife is grooved along one face in a vertical channel 263 through which the air from the can may escape, as the fish charge enters.

A scraper plate 264 is preferably secured to the frame of the turret section 194 and its end extends into the channel 263 to prevent crowding of the fish into the channel and to strip it clean as the knife is withdrawn. The flat side of the fish charge 215 which comes opposite the vent knife also allows for escape of air and permits a quicker filling operation.

Discharge of the fish 215 from the measuring chamber leaves it empty and ready for the next charge when it returns to its chamber filling position. In the meantime the filled can continues around its circular path of travel with the turret until it reaches a curved wall 271 formed in the plate 249. This wall sweeps the can from the turret and positions it onto a discharge runway 272 where it passes into a pocket 273 of a rotating starwheel 274. This starwheel is mounted upon the upper end of a shaft 275 which may be suitably rotated in any suitable manner. Continual rotation of the starwheel sweeps the can along the discharge runway and out of the machine, a guide rail 276 associated with the runway directing its course of travel.

It is thought that the invention and many of its attendant advantages will be understood from the foregoing description, and it will be apparent that various changes may be made in the form, construction and arrangement of the parts, without departing from the spirit and scope of the invention or sacrificing all of its material advantages, the form hereinbefore described being merely a preferred embodiment thereof.

I claim:

1. In a fish canning machine, the combination, of a horizontal feeding tunnel having a fixed outer part provided with a discharge opening at one end and an oscillatory part having a floor for supporting the fish, a turret having a vertical axis and rotatively disposed adjacent the discharge end of said tunnel, a plurality of measuring chambers carried by said turret, means for bodily moving the oscillatory part of said tunnel in time with the movement of a measuring chamber to position its discharge opening in registration with a said measuring chamber, and instrumentalities carried on said tunnel for advancing cut fish through said tunnel and out of said discharge opening and into said measuring chamber while the tunnel opening and the chamber are in registration.

2. In a fish canning machine, the combination of a horizontal feeding tunnel having a fixed outer part and an oscillatory inner part having a floor for supporting the fish and a discharge opening, a turret rotatively disposed on a vertical axis adjacent the discharge end of said tunnel, a plurality of measuring chambers carried by said turret, means for bodily moving the oscillatory part of said tunnel in time with the movement of a measuring chamber to position its discharge opening in registration with a said measuring chamber while the latter is at its largest capacity, instrumentalities for advancing cut fish through said tunnel and out of said discharge opening and into said measuring chamber while the tunnel opening and the chamber are in registration, and means for closing said chambers on the fish therein.

3. In a fish canning machine, the combination of a horizontal feeding tunnel having a fixed outer part and an oscillatory part having a floor for supporting the fish and a discharge opening at one end, a turret rotatively disposed on a vertical axis adjacent the discharge end of said tunnel, a plurality of measuring chambers carried by said turret, means for bodily moving the oscillatory part of said tunnel in time with the movement of a measuring chamber to position its discharge opening in registration with a said measuring chamber, instrumentalities for advancing cut fish through said tunnel and out of said discharge opening and into said measuring chamber while the tunnel opening and the chamber are in registration, and a cutter for severing a charge of fish from the remaining fish in said tunnel when said measuring chamber is filled.

4. In a fish canning machine, the combination of a horizontal feeding tunnel having a fixed outer part and an oscillatory part having a floor for supporting the fish and a discharge opening at one end, a turret rotatively disposed on a vertical axis adjacent the discharge end of said tunnel, a plurality of measuring chambers carried by said turret, feeding devices for conveying empty cans into said turret, means for bodily moving the oscillatory part of said tunnel in time with the movement of a measuring chamber to position its discharge opening in registration with a said measuring chamber, instrumentalities for advancing cut fish through said tunnel and out of said discharge opening and into said measuring chamber while the tunnel opening and the chamber are in registration, and means for transferring the charge of fish of a said measuring chamber into a said can while it is being carried by said turret.

5. In a fish canning machine, the combination of a feeding tunnel having a discharge opening at one end, a turret rotatively disposed adjacent the discharge end of said tunnel, a plurality of measuring chambers carried by said turret, means for bodily moving said tunnel to position its discharge opening in registration with a said measuring chamber, instrumentalities for advancing cut fish through said tunnel and out of said discharge opening and into said measuring chamber while the tunnel opening and the chamber are in registration, and means for altering the shape and size of said tunnel discharge opening to keep the opening in registration with said moving measuring chamber during the filling of the chamber and the movement of the tunnel.

6. A fish canning machine, comprising a feeding tunnel having an outer fixed part and an inner oscillating feeding part having opposed side walls and a bottom supporting wall and a discharge end opening, instrumentalities for advancing cut fish between said tunnel side walls and out of said discharge opening, a cutter mounted adjacent the discharge opening of said tunnel, and means for bodily moving the oscillating part of said tunnel to carry its side walls and bottom wall horizontally toward and the fish contained therein against said cutter to segregate the fish remaining between the tunnel walls from the charge of fish which has passed through said discharge opening, and means for placing said charge of fish into a can.

7. A fish canning machine, comprising an oscillating feeding tunnel horizontally arranged and having opposed side walls and a fish-supporting bottom and discharge end opening, instrumentalities for advancing cut fish between said tunnel side walls and out of said discharge opening, a cutter mounted adjacent the discharge opening of said tunnel, means for bodily moving said tunnel to carry its side and bottom walls toward and the fish supported therein against said cutter to segregate the fish remaining between the tunnel walls from the charge of fish which has passed through said discharge opening, and means associated with one of said tunnel walls for backing up the fish mass against the cutter during the cutting operation, and means for placing said charge of fish into a can.

8. A fish canning machine, comprising an oscillating feeding tunnel horizontally arranged and oscillatable and having opposed side walls and a fish-supporting bottom and a discharge end opening, instrumentalities for advancing cut fish between said tunnel side walls and along said bottom and out of said discharge opening, a cutter mounted adjacent the discharge opening of said tunnel, and means for presenting the fish to said cutter by bodily moving said tunnel walls so that one wall backs up and crowds the fish into said cutter to segregate a charge of fish from the fish mass, and means for placing said charge of fish into a can.

9. A fish canning machine, comprising an oscillating feeding tunnel horizontally arranged and having opposed side walls and a fish-supporting bottom and a discharge end opening, fork instrumentalities carried on a said side wall and operating through a slot in the wall for advancing cut fish between the tunnel walls and out of said discharge opening, a cutter mounted adjacent the discharge opening of said tunnel, and means for bodily moving said tunnel to move its side walls and the fish supported therebetween toward said cutter, the side wall opposite the said fork instrumentalities forcing the fish mass against said cutter to effect segregation of a charge of fish from said fish mass, and means for placing said charge of fish into a can.

10. A fish canning machine, comprising an oscillating feeding tunnel having opposed side walls and a discharge end opening, a turret rotatively disposed adjacent the discharge end of said tunnel, a plurality of measuring chambers carried by said turret, instrumentalities for advancing cut fish between said tunnel walls and out of said discharge opening and into a said measuring chamber during the rotation of said turret, and means for bodily moving said tunnel to move its side walls in alignment with the walls of a moving measuring chamber while the fish is passing through said discharge opening and into said measuring chamber.

11. A fish canning machine, comprising an oscillating feeding tunnel horizontally arranged and oscillatable having opposed side walls and a fish supporting bottom and a discharge end opening, a turret rotatively disposed on a vertical axis and horizontally movable adjacent the discharge end of said tunnel, a plurality of measuring chambers carried by said turret, instrumentalities for advancing cut fish between said tunnel walls and out of said discharge opening and into a said measuring chamber during the rotation of said turret, means for bodily moving said tunnel to move with the walls of a moving measuring chamber while the fish is passing through said discharge opening and into said measuring chamber, and a cutter against which the fish is carried by said tunnel for separating the fish charge in said measuring chamber from the fish mass remaining in said tunnel.

12. A fish canning machine, comprising an oscillating feeding tunnel having opposed side walls and a discharge end opening, a turret rotatively disposed adjacent the discharge end of said tunnel, feeding devices for conveying empty cans in said turret, a plurality of measuring chambers carried by said turret, instrumentalities for advancing cut fish between said tunnel walls and out of said discharge opening and into a said measuring chamber during the rotation of said turret, means for bodily moving said tunnel to move its side walls in alignment with the walls of a moving measuring chamber while the fish is passing through said discharge opening and into said measuring chamber, a cutter for separating the fish charge in said measuring chamber from the fish mass remaining in said tunnel, and means for transferring the separated fish charge from said measuring chamber into a can while carried by said turret.

13. In a fish canning machine, the combination of a stationary feeding tunnel, a movable feeding tunnel having a discharge opening at one end, a turret rotatively disposed adjacent the discharge end of said movable tunnel, a plurality of measuring chambers carried by said turret, means for bodily moving the said movable tunnel to move its discharge opening in registration with a said measuring chamber and for maintaining registration during a filling operation, and instrumentalities for advancing cut fish through said tunnels and out of said discharge opening and into said measuring chamber while the tunnel opening and the chamber are in registration.

14. A fish canning machine comprising in combination a stationary feeding tunnel for fish, a movable feeding tunnel hinged to said stationary tunnel and having a discharge opening at its unhinged end, a measuring chamber, means for moving said chamber past the discharge end of said movable tunnel, means for moving said movable tunnel on its hinge to cause its discharge end to move in registration with said measuring chamber during a part of its travel, and instrumentalities for transferring a charge of fish during such registration from said movable tunnel through its discharge opening and into said measuring chamber.

15. A fish canning machine comprising in combination a stationary feeding tunnel for fish, a movable feeding tunnel hinged thereto the latter having a discharge opening at its unhinged end, a measuring chamber, means for moving said chamber past the discharge end of said movable tunnel, means for moving said movable tunnel on its hinge to cause its discharge end to move in registration with said measuring chamber during a part of its travel, means for maintaining a closed connection between said movable tunnel during such hinging movement, and instrumentalities for transferring a charge of fish during such registration from said movable tunnel through its discharge opening and into said measuring chamber.

16. A fish canning machine, comprising an oscillating feeding tunnel having opposed side walls and a discharge end opening one of said walls having a sliding member located therein, a turret rotatably disposed adjacent the discharge end of said tunnel, a plurality of measuring chambers carried by said turret, instrumentalities for advancing cut fish between said tunnel walls and out of said discharge opening and into a said measuring chamber during the rotation of said turret, means for oscillating said tunnel bodily to move its side walls in alignment with the walls of a moving measuring chamber during discharging of fish from said discharge opening, and means for moving said sliding wall member to maintain closed connection between said tunnel and said measuring chamber during the oscillation of said tunnel.

17. A fish canning machine having in combination a can-carrying turret, a turret having pockets for the reception of charges of fish, a movable tunnel horizontally arranged and having rigidly united top, bottom and side walls, for delivering fish to said pockets, said tunnel being movable with the turret during such delivery of fish, and a knife against which the fish is carried by the movement of the tunnel and the turret for the severing of the charge of fish from the fish in said tunnel.

WALTER E. ROONEY.